United States Patent

Kurosawa et al.

Patent Number: 5,164,929
Date of Patent: Nov. 17, 1992

[54] STOPPER FOR TRAYS IN A MAGAZINE OF A CD PLAYER

[75] Inventors: Atsushi Kurosawa; Sei Onishi; Kiyoshi Morikawa; Kiyohito Kajihara; Osamu Kitazawa; Kaoru Takemasa, all of Saitama, Japan

[73] Assignee: Pioneer Electronic Corporation, Tokyo, Japan

[21] Appl. No.: 616,519

[22] Filed: Nov. 21, 1990

[30] Foreign Application Priority Data

Feb. 16, 1990 [JP] Japan .................................. 2-35452
Feb. 16, 1990 [JP] Japan .................................. 2-35457

[51] Int. Cl.$^5$ .............................................. G11B 17/00
[52] U.S. Cl. ...................................... 369/36; 369/34; 369/77.1
[58] Field of Search ................... 369/36, 37, 38, 39, 369/75.1, 75.2, 77.1, 77.2, 178, 179, 191, 194; 360/98.04, 92, 99.02, 99.06

[56] References Cited

U.S. PATENT DOCUMENTS

| | | | |
|---|---|---|---|
| 4,691,309 | 9/1987 | Suzuki | 369/38 |
| 4,737,945 | 4/1988 | Yamazaki et al. | 369/36 |
| 4,796,244 | 1/1989 | Tsuruta et al. | 369/38 |
| 4,841,499 | 6/1989 | Takahashi et al. | 369/36 X |
| 5,034,936 | 7/1991 | Kurasawa et al. | 369/36 |

FOREIGN PATENT DOCUMENTS

| | | | |
|---|---|---|---|
| 0204548 | 8/1988 | Japan | 369/191 |
| 0291255 | 11/1988 | Japan | 369/178 |

Primary Examiner—Stuart S. Levy
Assistant Examiner—Tan Nguyen
Attorney, Agent, or Firm—Nikaido, Marmelstein, Murray & Oram

[57] ABSTRACT

A CD player has a magazine containing a plurality of trays each of which mounts the CD, a magazine holder for holding the magazine, and a frame for vertically movably supporting the magazine holder. A pair of opposed stopper plates are provided on the frame adjacent an outlet of the tray provided on the magazine. Opposed ends of the stopper plates form a gap therebetween having a width through which only one tray is passed.

2 Claims, 17 Drawing Sheets

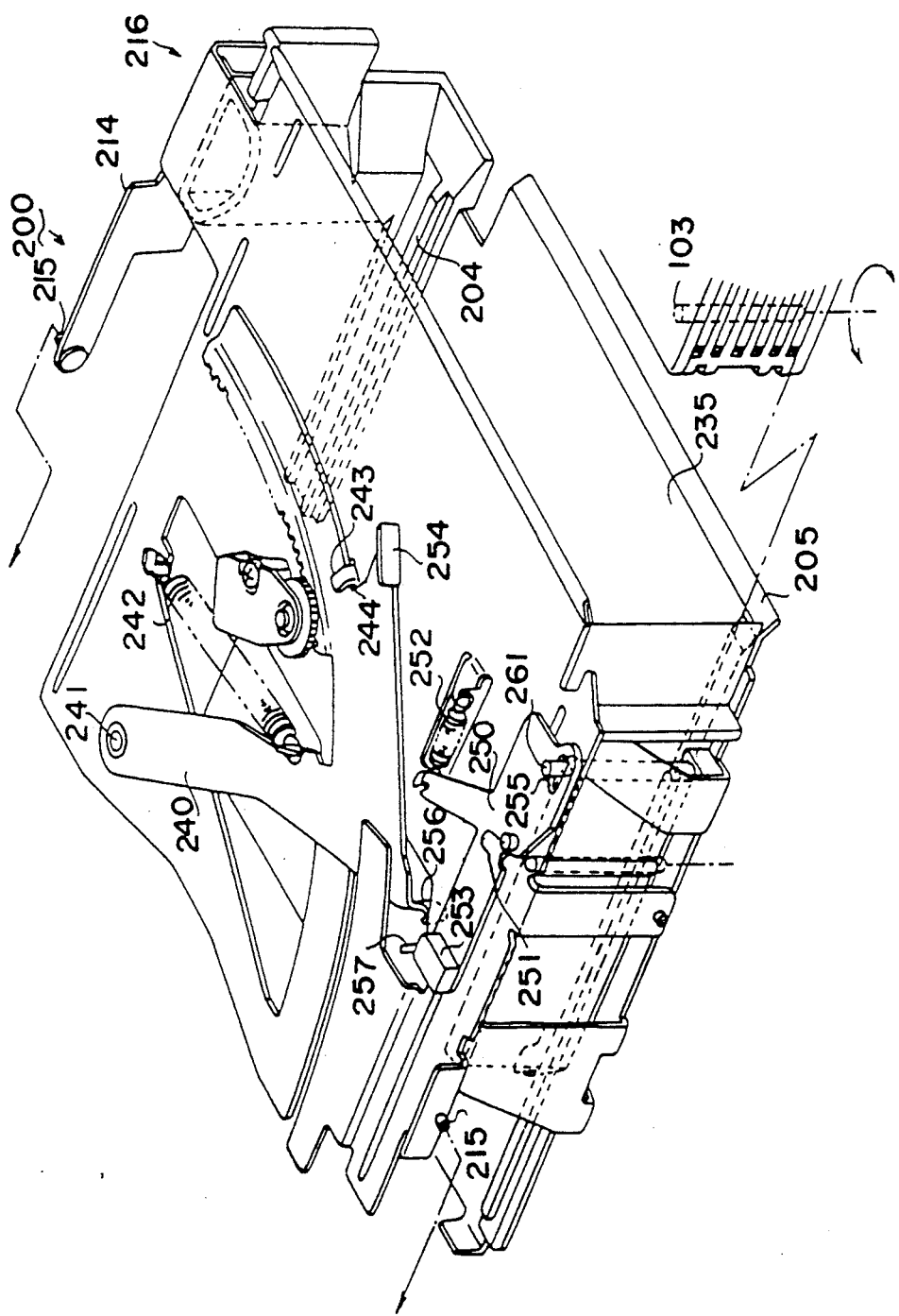

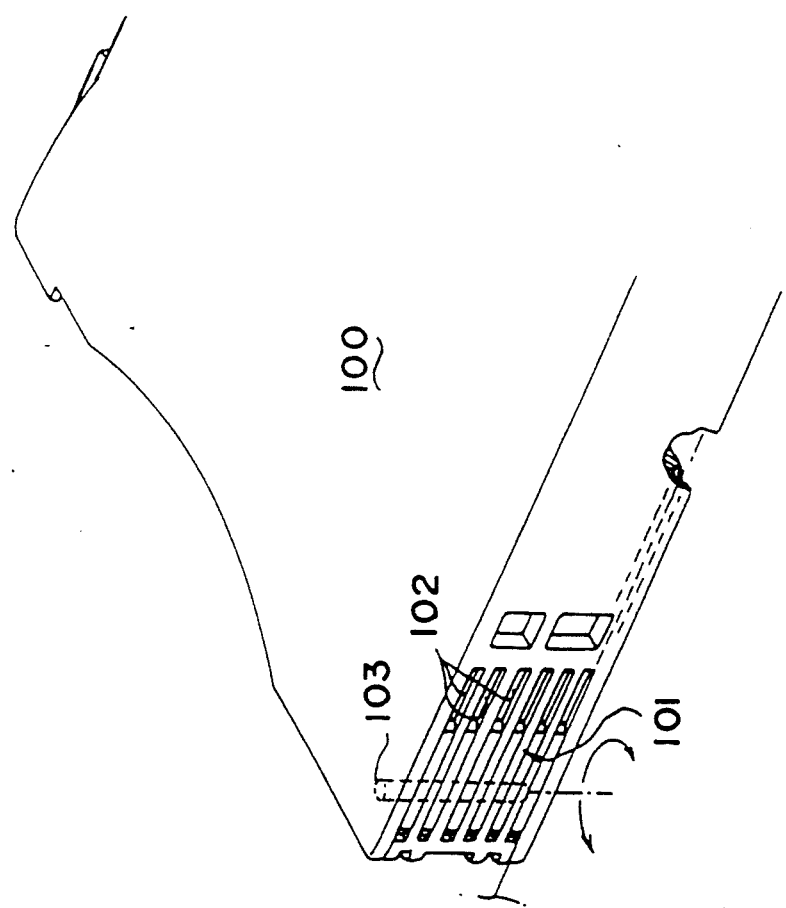

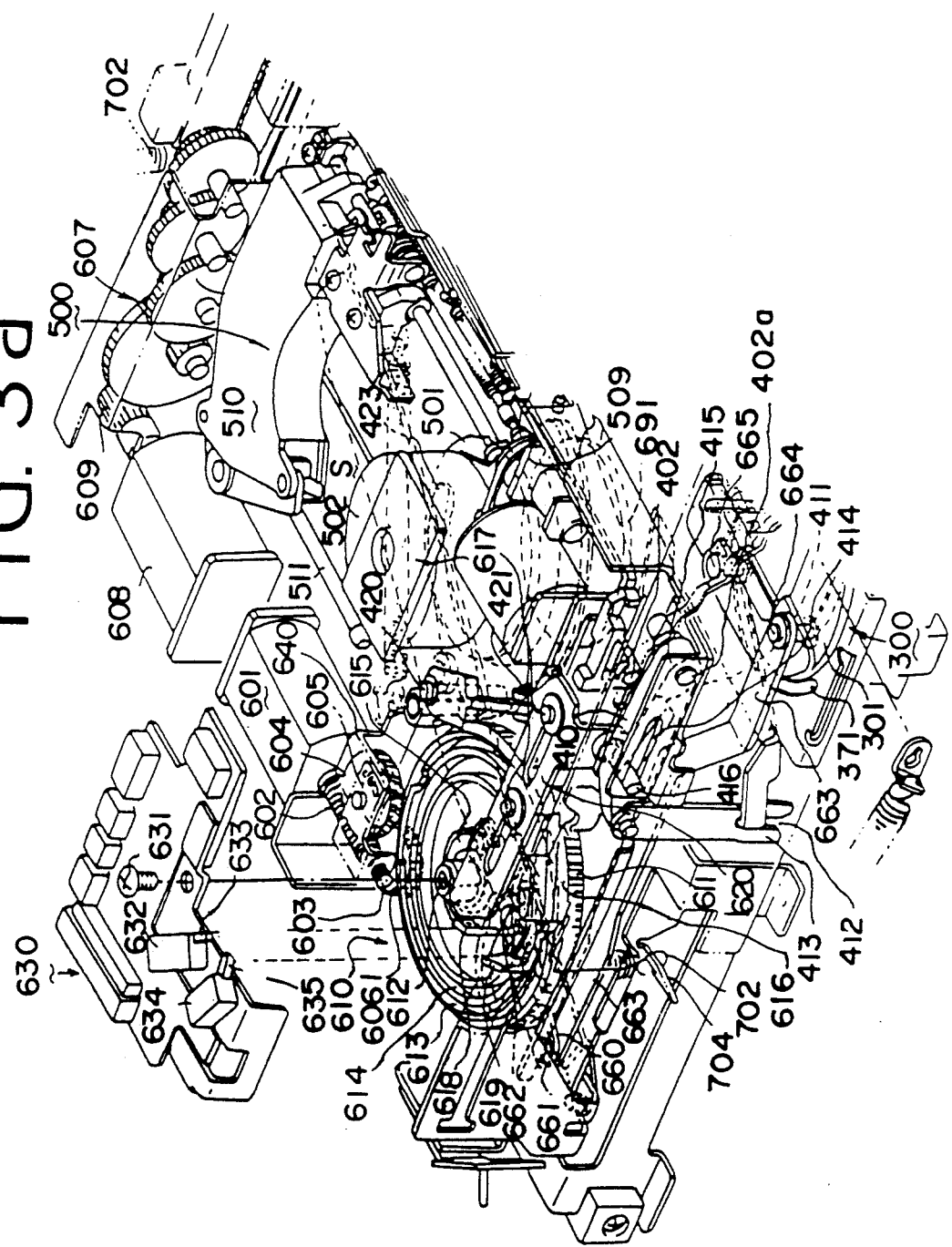

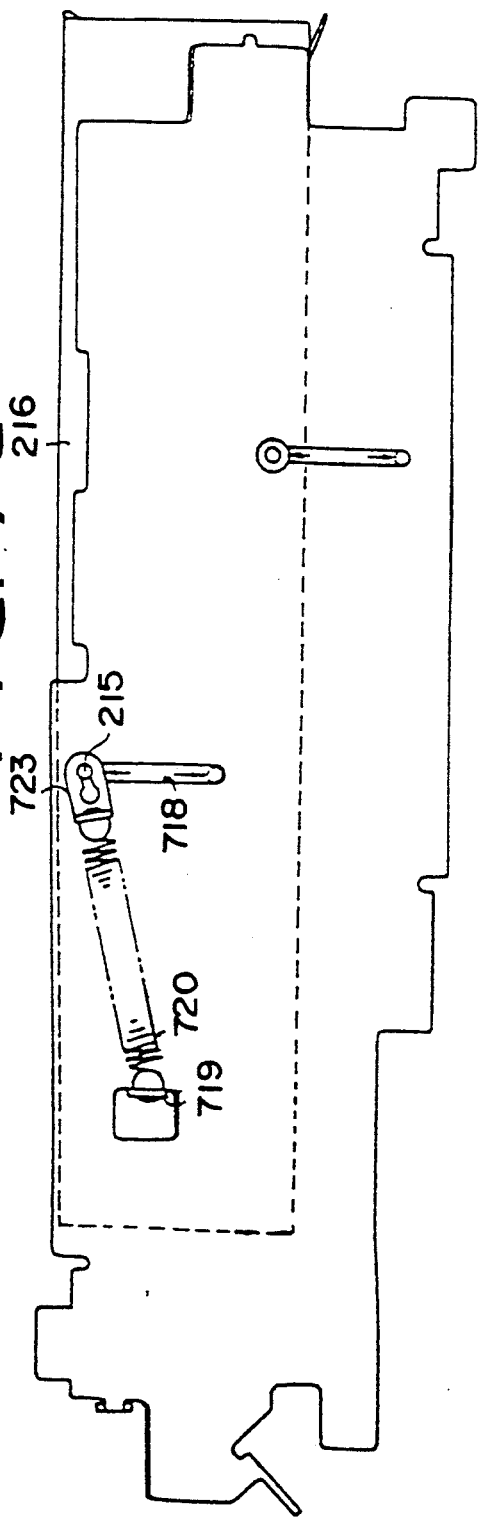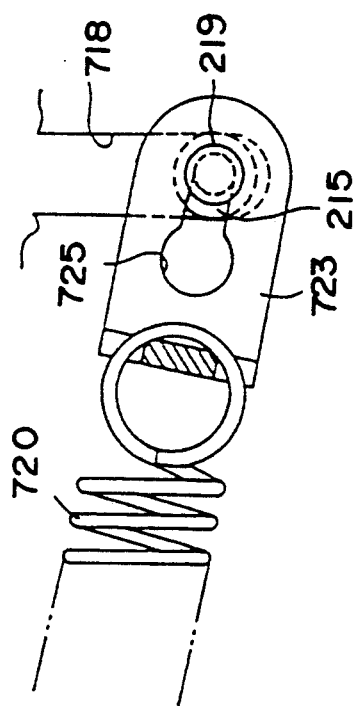

STOPPER FOR TRAYS IN A MAGAZINE OF A CD PLAYER

BACKGROUND OF THE INVENTION

The present invention relates to a stopper for preventing unnecessary CD trays in a magazine of a car CD player from projecting.

A home CD player is designed so as to be horizontally disposed. However, the car CD player is disposed horizontally or vertically depending on the space for arranging the player.

The inventors of the present invention have proposed a CD player where a pickup normally operates either in the vertical disposition or the lateral disposition of the player. For example, Japanese Patent Application 1-109666 discloses such a CD player which is shown in FIG. 21.

Referring to FIG. 21, a car CD player 1 comprises an outer casing 2 and an inner casing 3 mounted in the casing 2. The inner casing 3 is supported in the casing 2 through a pair of springs 11 provided between each of the longitudinal inner sides 2a of the casing 2 and opposing outer sides 3a of the inner casing 3. Dampers 4 are provided between the outer casing 2 and the inner casing 3 at the four corners. Each damper 4 is charged with viscous oil such as a silicon oil. A supporting rod 4a provided at one end of the damper 4 is connected to a support plate 3b formed at each corner of the inner casing 3. The other end of the damper 4 is connected to the outer casing 2.

The lower end of each spring 11 is rotatably mounted on a support pin 10 secured on the side 3a. The upper end of the spring is rotatably mounted on a lobe 12a of a rotational disk 12 which is parallel with the side 2a and rotatably mounted on the side 2a of the inner wall of the outer casing 2 through a pin 13 at the center thereof. Each disk 12 has a pair of arcuated slits 14 and 15 formed symmetrically with respect to the pin 13. Each slit 14, 15 extends across an angle of 90 degrees. Guide pins 16 and 17 secured to the sides 2a engage with the slits 14 and 15, respectively. The springs 11 in cooperation with the dampers 4 absorb the shocks and vibrations of the vehicle when it is driven.

The CD player 1 is horizontally disposed as shown in FIG. 21, or vertically disposed in an upright position by rotating the player about a lateral axis 90 degrees and mounted in a trunk of a motor vehicle.

When mounting the CD player 1 in the upright position, the four rotational disks 12 on the sides 2a are rotated 90 degrees in the counterclockwise direction. Thus, the springs 11 extend in the vertical direction, thereby vertically suspending the inner casing 3.

In one lateral side of the inner casing 3 is formed with an opening 5 through which a magazine M is inserted therein. The magazine M has a plurality of vertically layered trays t each of which holds a compact disk d. The CD player 1 is operated through an operation panel provided in the interior of the vehicle to play the required disks d. When the playback is started, a selected tray t is pushed out from the magazine and moved to a playback position shown in the figure through a loading mechanism. The disk d is thereafter rotated at a predetermined speed so that information written on the disk d is read out by a pickup 30.

In the case that the CD player is mounted in the trunk in the upright position, the outlet for the tray is located on the downward side of the magazine. Accordingly, trays on both sides of the selected tray are liable to be ejected together with the selected tray.

SUMMARY OF THE INVENTION

The object of the present invention is to provide a stopper which may prevent unnecessary trays from projecting from the magazine.

According to the present invention, there is provided a tray stopper of a CD player having a magazine containing a plurality of trays each of which mounts the CD, a moving device for moving one of the CDs between the magazine and a playback position, a magazine holder for holding the magazine, and a frame for vertically movably supporting the magazine holder.

A pair of opposed stopper plates are provided on the frame adjacent an outlet of the tray provided on the magazine. The opposed ends of the stopper plates form a gap there-between having a width through which only one tray is passed In an aspect of the invention, each stopper plate is a metal plate secured to the frame.

The other objects and features of this invention will become understood from the following description with reference to the accompanying drawings.

BRIEF DESCRIPTION OF THE DRAWINGS

FIGS. 2a and 2b show a perspective view of the car CD player and a magazine;

FIGS. 3a and 3b show an exploded perspective view of the car CD player;

FIG. 7a is a side view showing a frame;

FIG. 7b is an enlarged view showing a part of FIG. 7a;

DETAILED DESCRIPTION OF THE PREFERRED EMBODIMENT

Figure 1A:
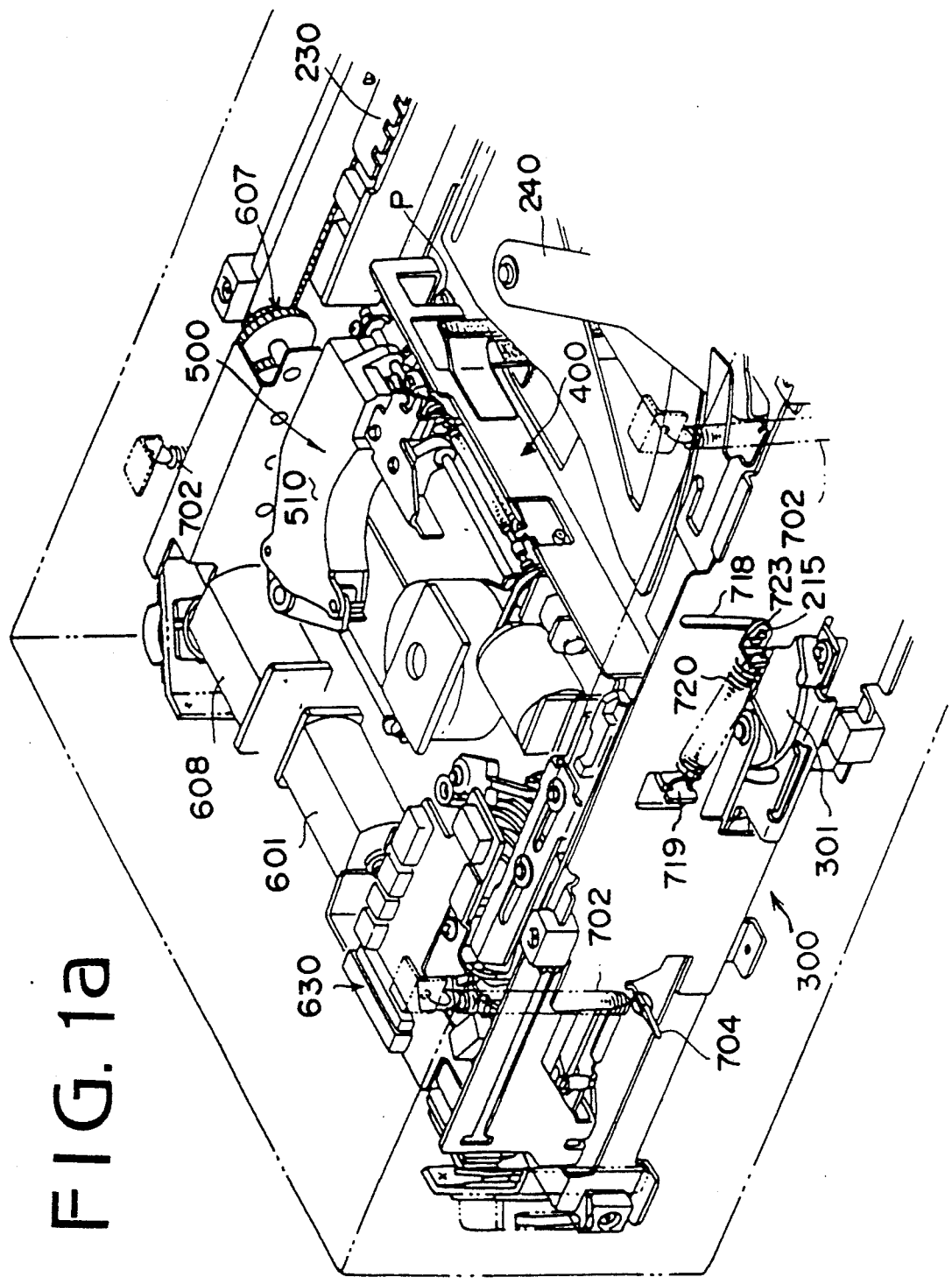
FIGS. 1a and 1b show a perspective view of a whole of a car CD player according to the present invention.
Figure 1B:
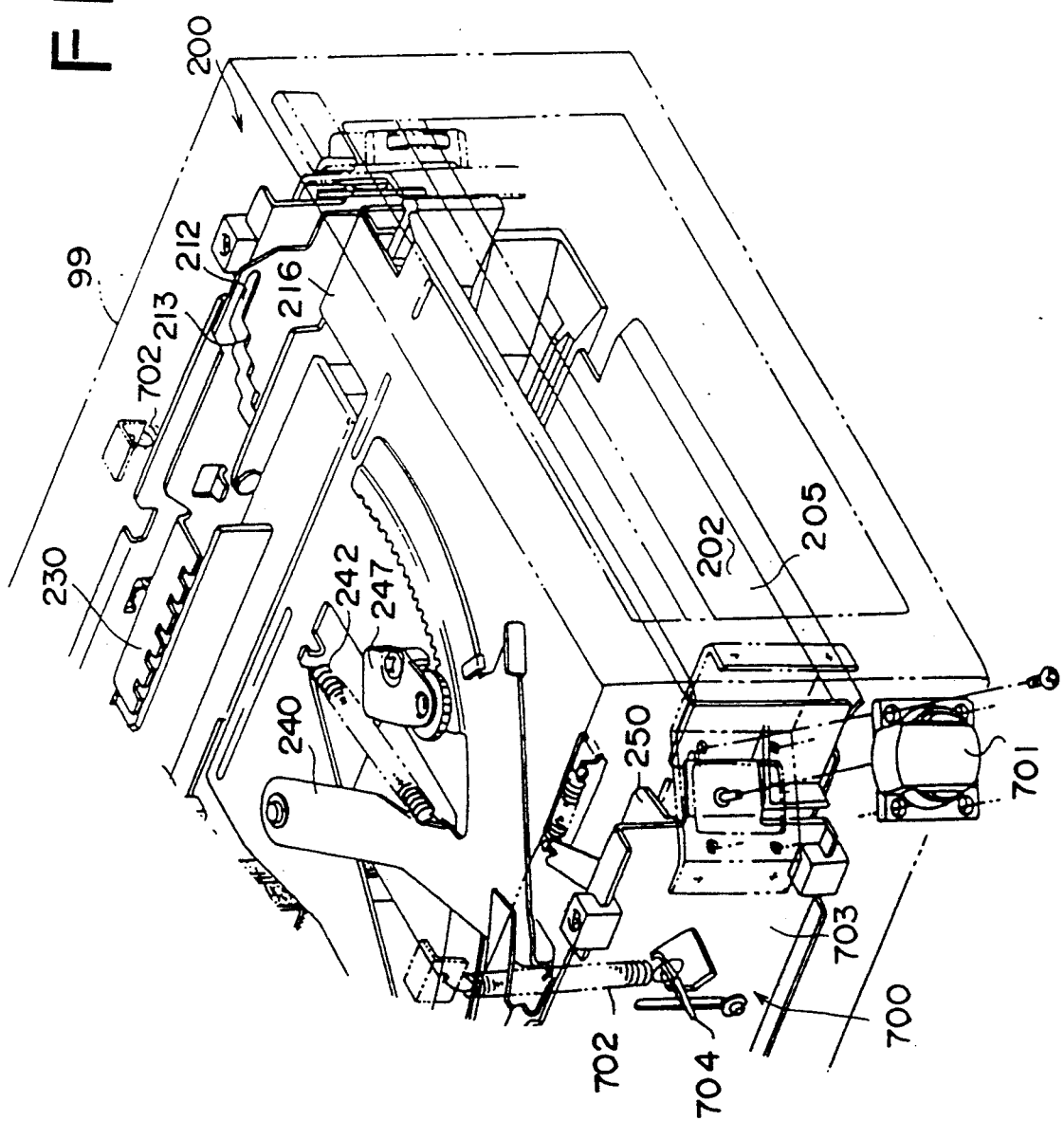
Figure 3B:
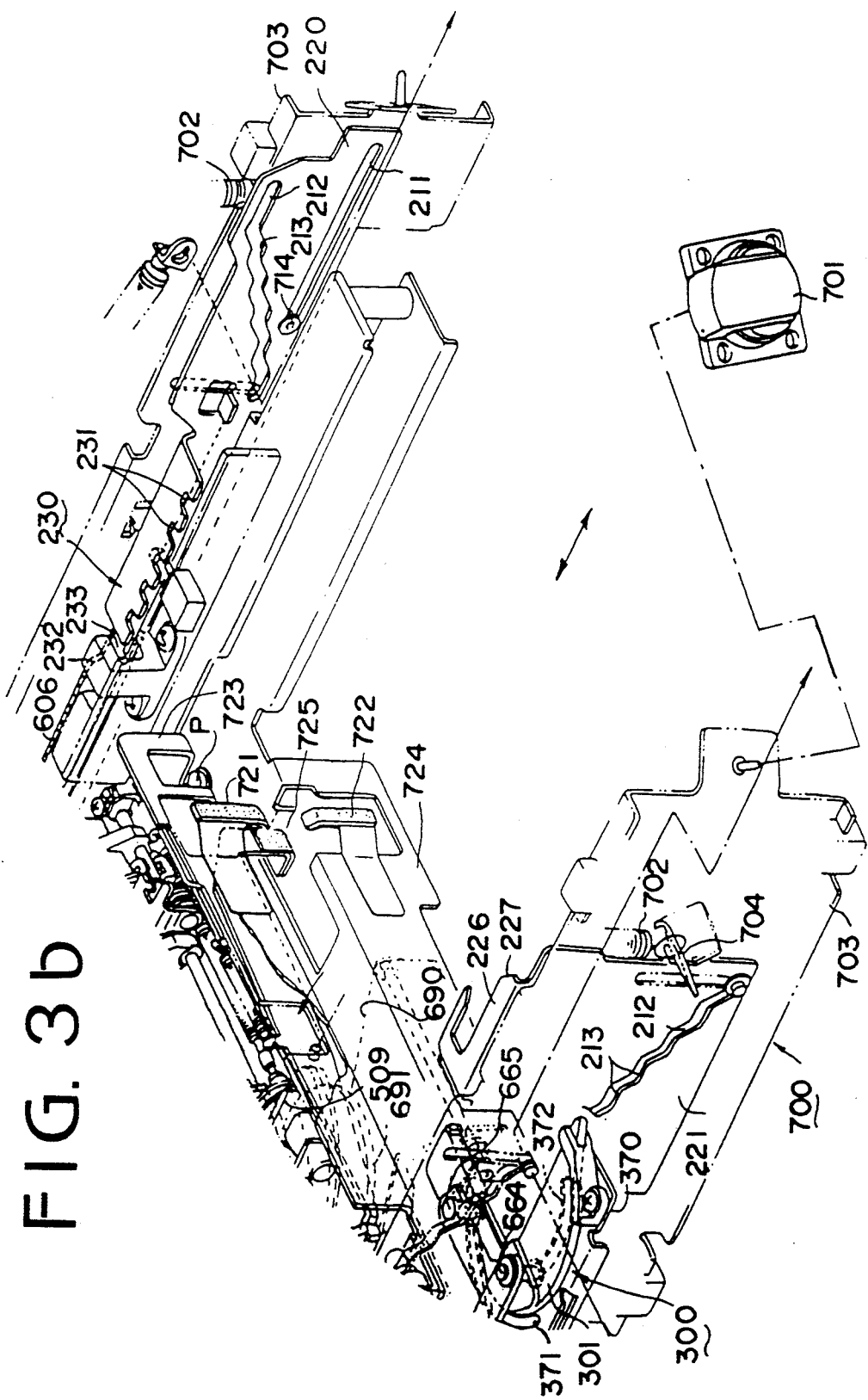

Referring to FIGS. 1a-1b, the car CD player is adapted to be mounted in a trunk of a motor vehicle and remotely controlled by operating a control unit mounted in a dashboard. The CD player comprises a magazine mounting device 200 having a magazine holder 216 for mounting a magazine 100 (FIG. 2b), a loading device 300 for loading a selected tray in the magazine, a clamp device 400 for removing a CD from the tray and clamping it to a turn table, and a reproducing device 500 having a pickup 510. These components are housed in a frame 700 supported in a casing 99 through dampers 701 and damping springs 702. A spring retainer 704 for the damping spring 702 is projected at 45 degrees from each side plate 703 of the frame 700.

Figure 4:
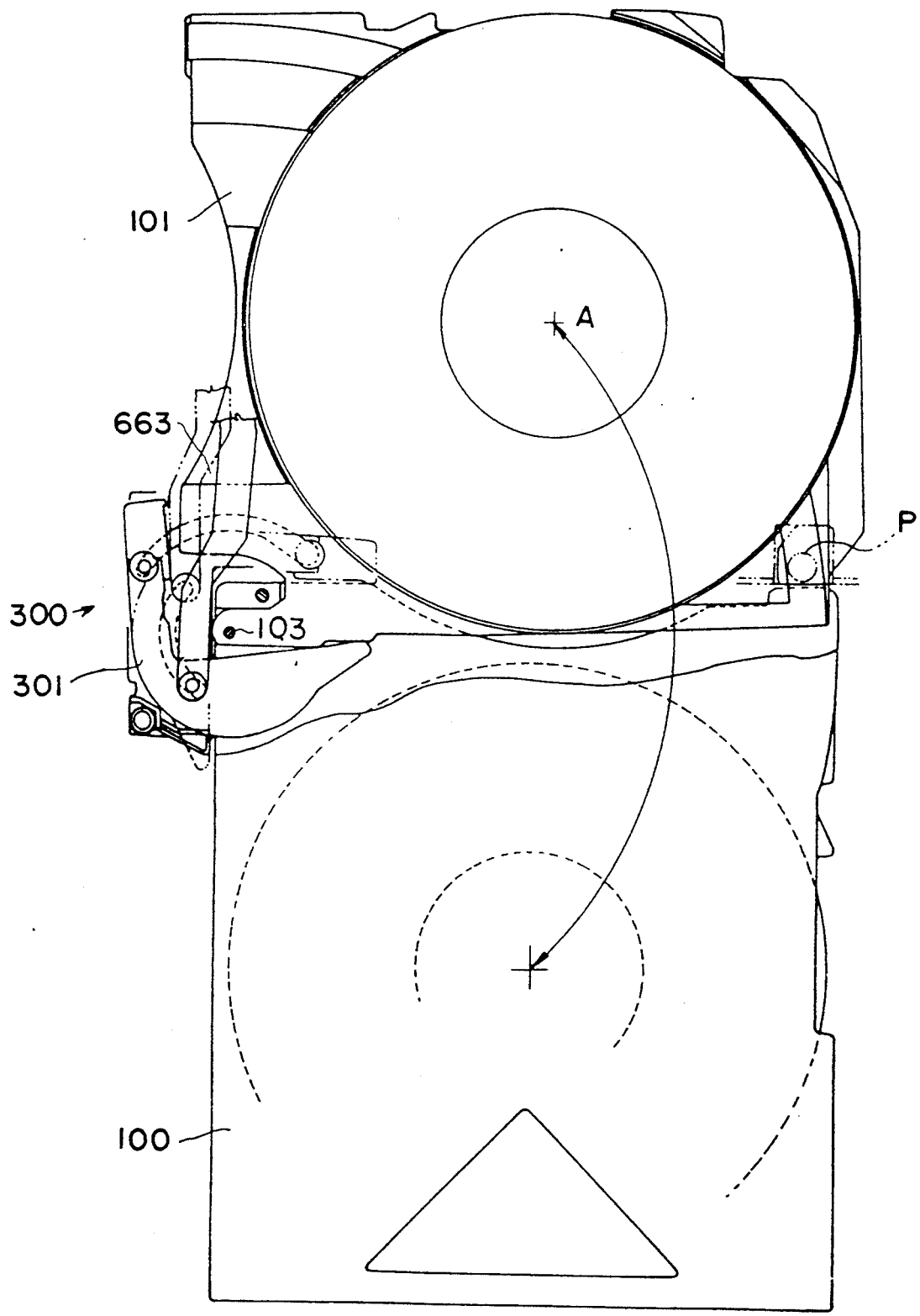
FIG. 4 shows a device for moving a tray mounting a CD between the magazine and a playback position.

Referring to FIGS. 2a-2b and 4, a plurality of trays 101 are housed in the magazine 100. The magazine has openings 102 at a side thereof, corresponding to the trays. A loading lever 301 of the loading device 300 engages one of the trays 101 through the opening 102, and causes it to rotate about an axis 103 (as shown by an arrow) to a playback position A in the player.

Figure 5:
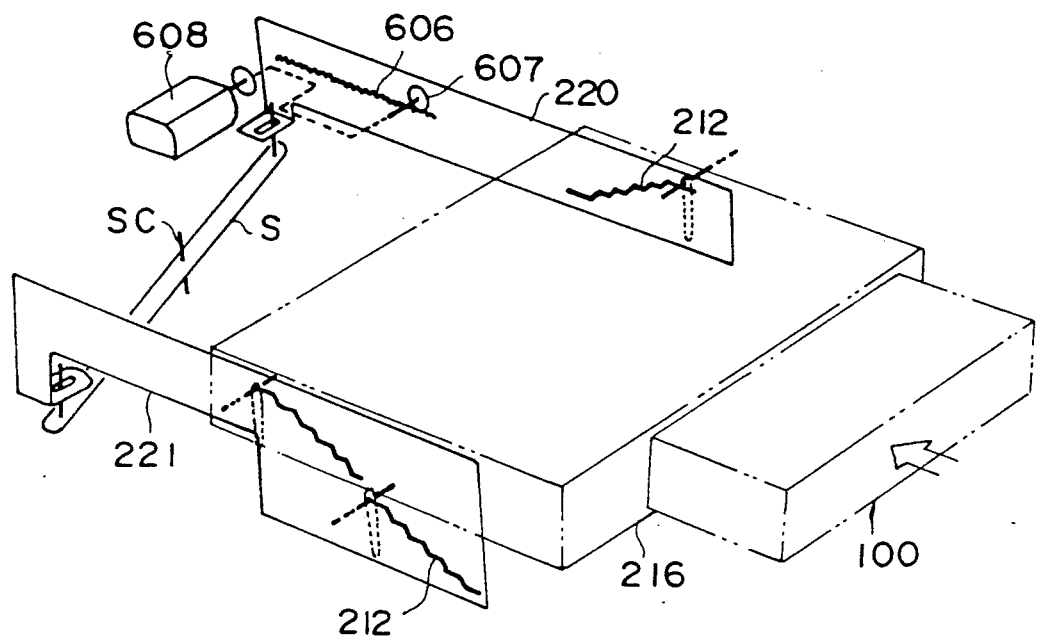
FIGS. 5 and 6 are perspective views showing a magazine holder elevating device.
Figure 6:
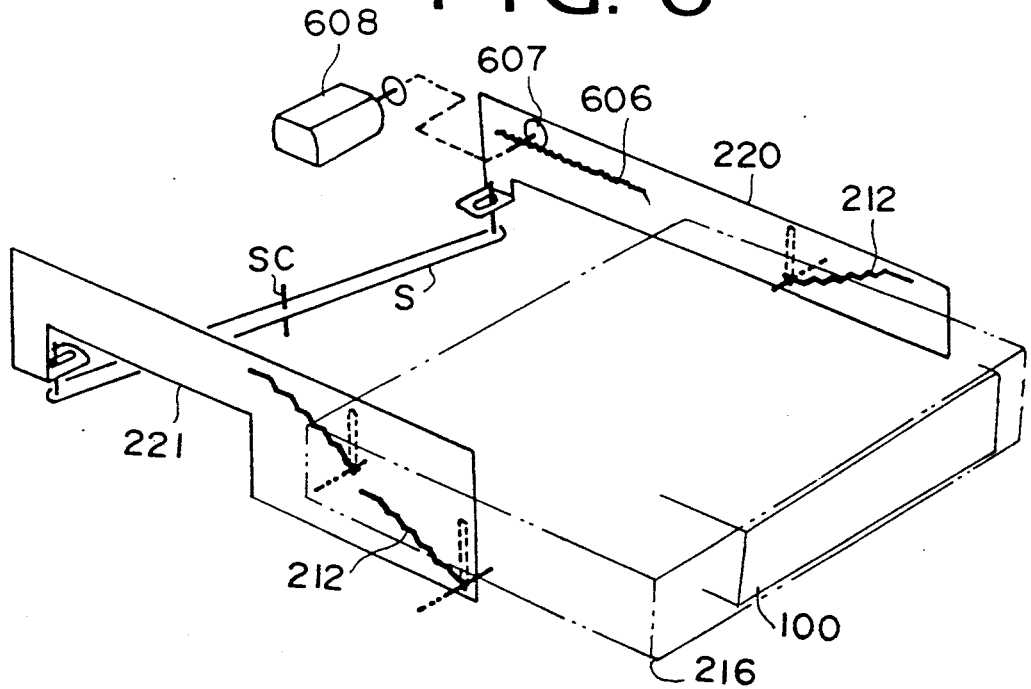

Referring to FIGS. 3a-3b, 5 and 6, slide plates 220 and 221 are slidably mounted on inside walls of the side plates 703, respectively. Each slide plate has a guide groove 211 with which a pin 714 on the side plate 703 is slidably engaged so as to guide the slide plate in the longitudinal direction. Both side plates are connected by a lever S as shown in FIG. 5. The lever S is pivoted at a central portion SC, so that both slide plates are moved in the opposite direction. Each slide plate has a stepwise supporting groove 212 having a plurality of steps 213.

The number of the steps is the number of the CD stowed in the magazine, that is six in the embodiment. In each groove, a pin 215 (FIG. 2a) provided on a projection 214 projected from the magazine holder 216 is slidably engaged. Both the supporting grooves 212 are inclined in the opposite directions, so that the magazine holder 216 is vertically moved when the slide plates 220 and 221 move in the opposite directions.

On the side plate 220, a position detector plate 230 having six slits 231 is formed, corresponding to the vertical position of the magazine holder.

A photosensor 232 is provided to detect the position of one of the slits 231, that is the position of the CD to be played.

The slide plate 220 has a rack 606 on an upper edge thereof, with which an end gear of a gear train 607 engages. The other end gear 609 of the gear train 607 is secured to rotating shaft of a motor 608 mounted on the frame 700.

A vertical elongated slit 718 (FIG. 1a) is formed in the side plate 703 and the pin 215 is slidably engaged with the slit 718 so as to restrict the movement in the forward and rearward directions of the magazine holder 216.

The side plate 703 is provided with a projecting lug 719 integrally formed with the side plate by cutting and bending the plate. A spring 720 is provided between the projecting lug 719 and the pin 215. Thus, the magazine holder 216 is urged to the lug 719 by the spring 720 so that the magazine holder 216 is held in a predetermined position in the frame 700.

Since the magazine holder 216 is firmly held in the frame by elastic force of the spring 720, the magazine holder is prevented from vibrating caused by the vibration and shock during the driving of the vehicle, thereby preventing the influence of the magazine holder on the reproduction of the CD.

Referring to FIGS. 7a and 7b, the spring 720 is engaged with the pin 215 through a collar 723. The collar 723 has a teardrop-shaped hole 725 having a small diameter portion and a large diameter portion. The pin 215 has a large head portion 219 corresponding to the large diameter portion of the hole 725.

The large head portion 219 of the pin 215 is inserted into the large diameter portion of the hole 725 of the collar 723 and moved to the small diameter portion. Thus, the large head portion 219 engages with the outside wall at the small diameter portion so as to prevent the pin 215 from removing from the collar 723.

Consequently, since it is not necessary to engage an attaching member such as an E-ring with the pin, the spring 720 is easily attached to the pin 215.

On the magazine holder 216, a swing lever 240 having a magazine abutting end 256 and a switch operating end 254 is pivotally mounted by a pin 241. The lever 240 is urged by a spring 242, so that an end 244 is abutted to a projection 243.

A lever 250 is pivotally mounted on the magazine holder 216, pivoted by a pin 251. The lever 250 is urged by a spring 252, abutting a side of an elongated hole 255 formed therein on a pin 261. A switch 253 is mounted on the lever 250 so that an actuating lever 257 thereof is operated by the switch operating end 254.

The magazine holder 216 has an opening 205 for receiving the magazine 100 and a bottom 235. On the bottom 235, an elongated plastic guide 204 is attached at an entrance zone of the magazine holder.

A motor 601 is mounted on the frame 700 for driving various mechanism. Securely mounted on a rotating shaft of the motor 601 is a worm 602 which is engaged with a worm wheel 604 rotatably mounted on a supporting plate 640. A thrust screw 603 is mounted on the plate 640 so as to receive the thrust of the worm 602. By rotating the screw 603, the gap between the screw and the end of the worm is adjusted.

The worm wheel 604, operatively connected through gears 605 and 6061 to teeth 611, is formed on a periphery of a disk cam 610 so as to rotate the cam.

Figure 10:
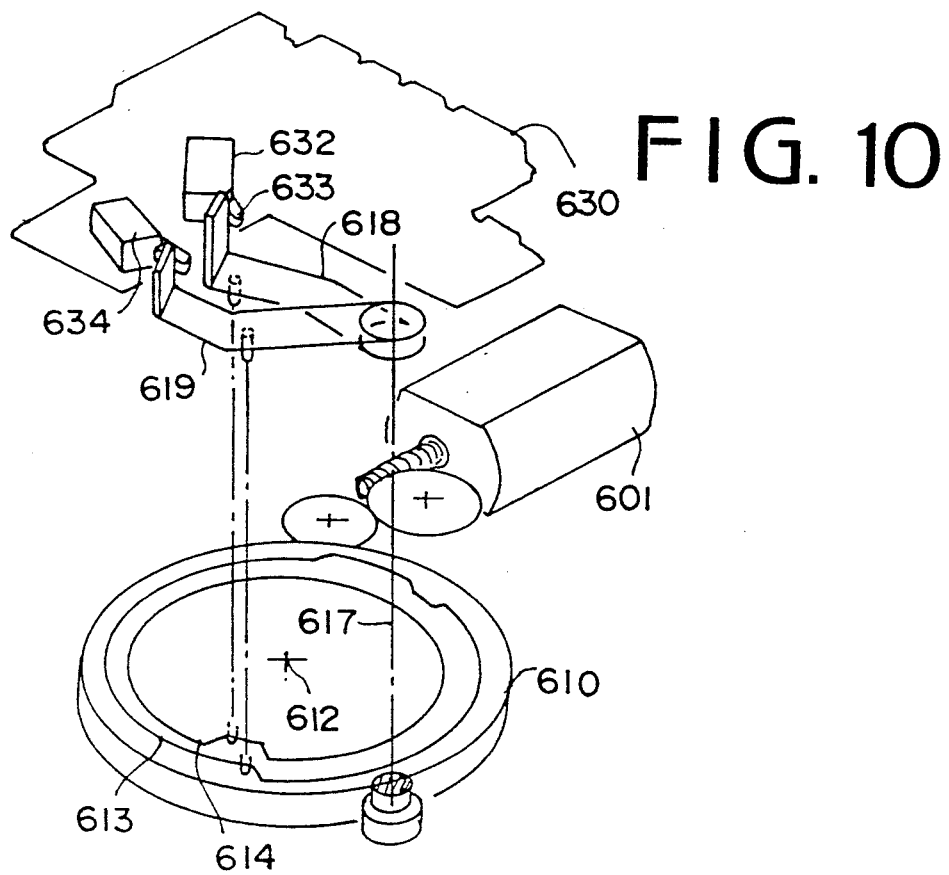
FIGS. 10 and 11 are perspective views showing a cam operated switches.
Figure 11:
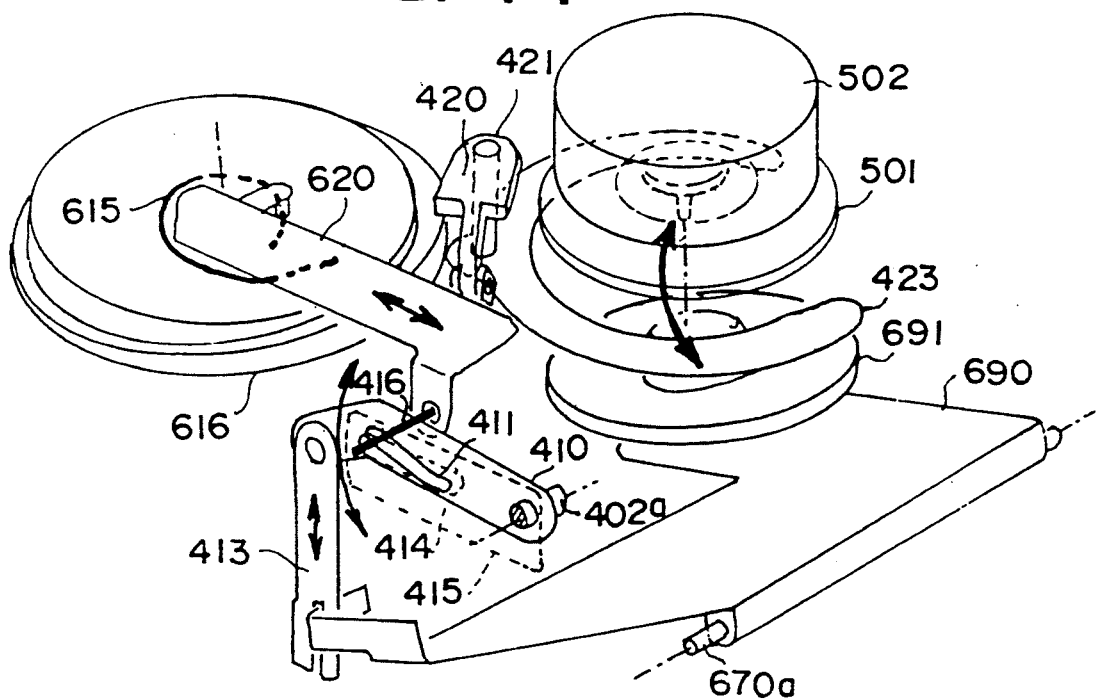

Referring to FIGS. 10 and 11, the disk cam 610 is pivotally mounted on a shaft 612 and has three cam grooves 613, 614 and 615, and a projected cam 616. A pair of levers 618 and 619 pivoted on a pin 617 engage with the cam grooves 613 and 614 at engaging ends, respectively. Engaged with the cam groove 615 is a slide lever 620 having an engaging pin 416 and provided to be moved by the cam groove in the longitudinal direction of the player.

Above the cam 610 a substrate 630 is secured to the shaft 612 by a screw 631 (FIG. 3a). On the substrate 630, a tray position detecting switch 632 and a CD position detecting switch 634 are mounted. The switches 632 and 634 are adapted to be operated by the levers 618 and 619.

When the tray 101 is in the magazine 100, the cam 610 is at an initial position where the lever 618 engages with an operating rod 633 to close the switch 632. The cam 610 starts to rotate for loading the CD, and the lever 618 separates from the rod 633 to open the switch. When the CD is clamped on a turn table as described hereinafter, the lever 618 engages with the rod 633 to close the switch again. Namely, the switch 632 produces output signals when the CD is in the magazine and at the clamping position, and when CD starts to move from the magazine and from the clamping position.

Figure 12:
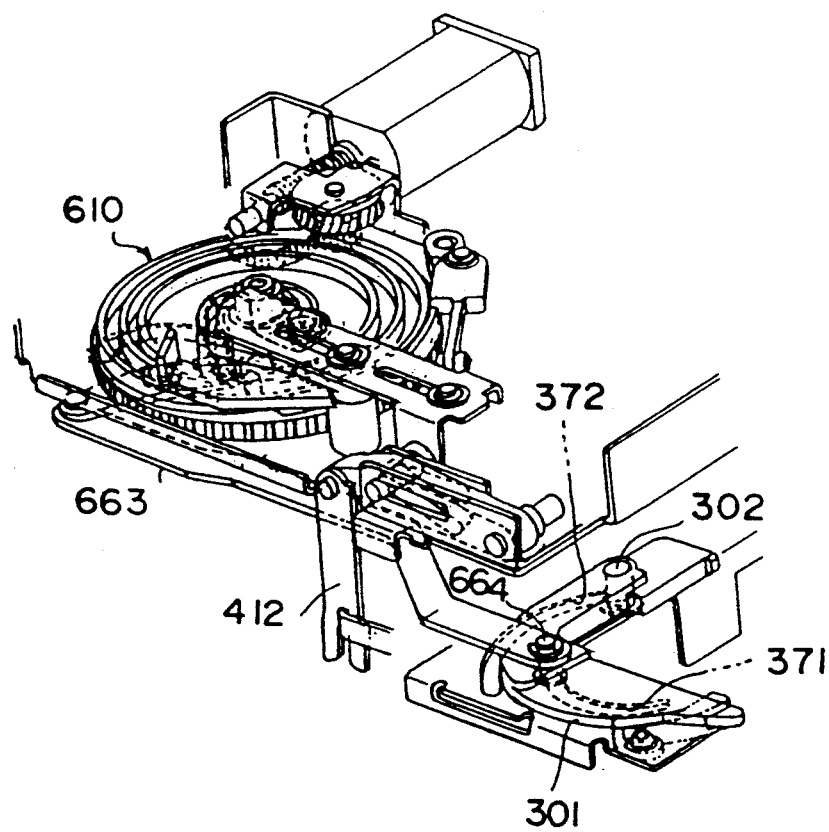
FIGS. 12, 13 and, 14 are perspective views showing a tray loading device.
Figure 13:
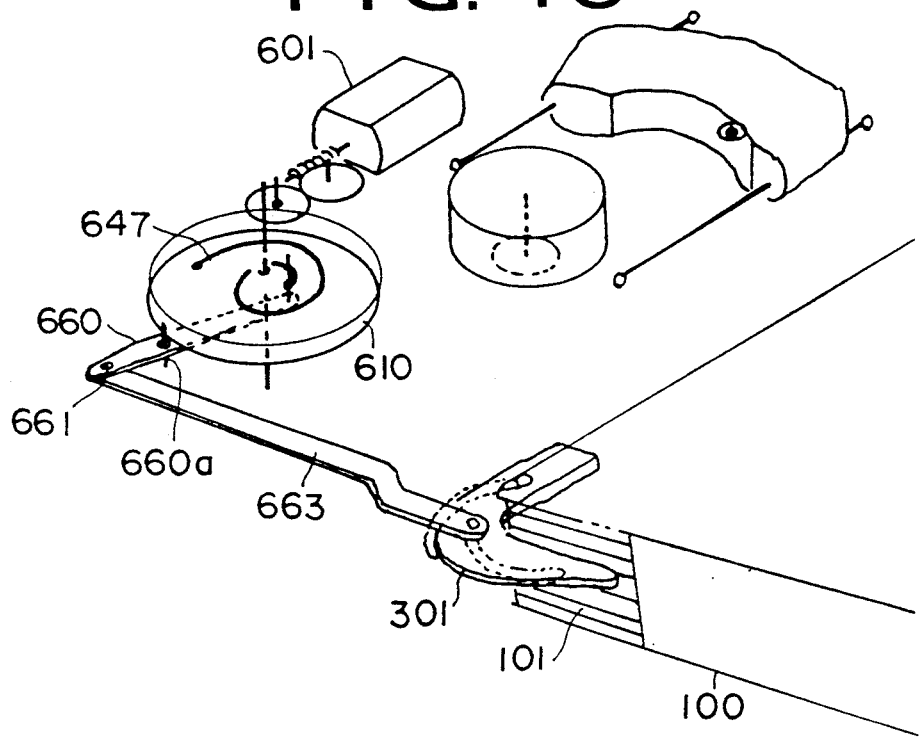
Figure 14:
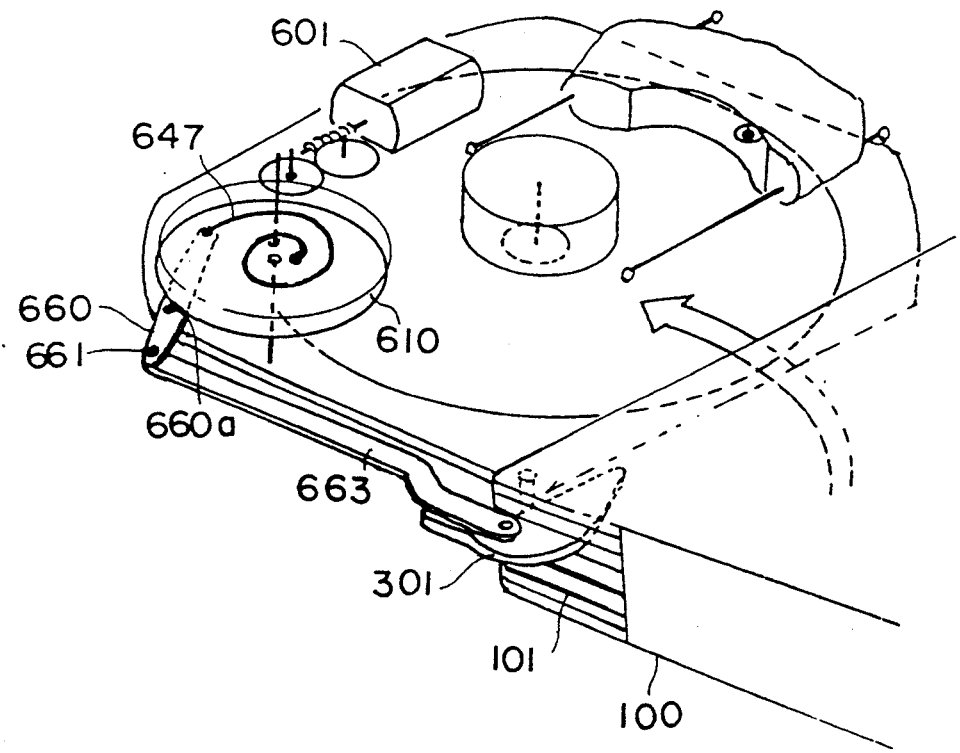

Referring to FIGS. 12 to 14, on the underside of the cam 610, a cam groove 647 is provided for loading the tray 101. An end of a lever 660 pivoted at 660a is slidably engaged with the cam groove 647, and the other end of the lever is connected to an end of a connecting link 663 by a pin 661. The other end of the link 663 is connected to the loading lever 301 by a pin 664.

Figure 15:
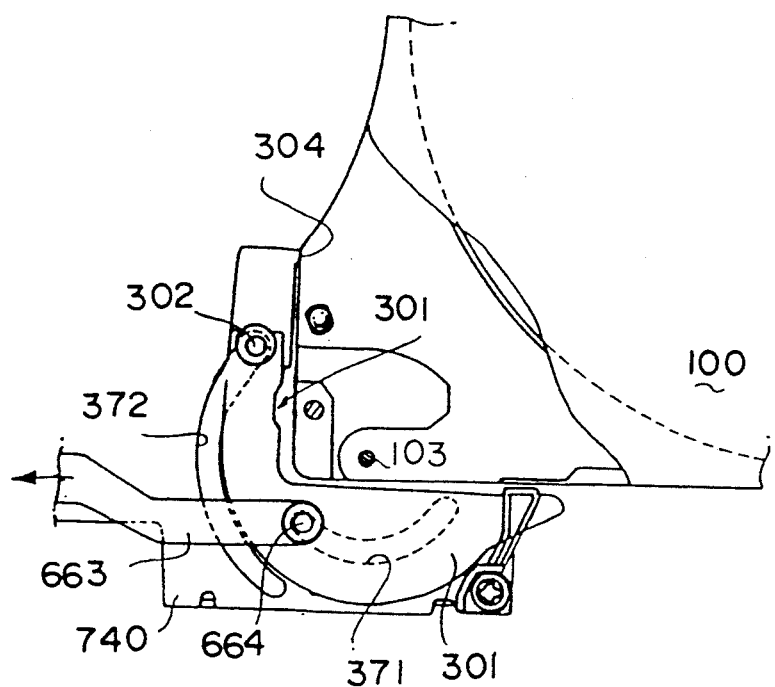
FIGS. 15 and 16 are plan views showing the tray loading device.
Figure 16:
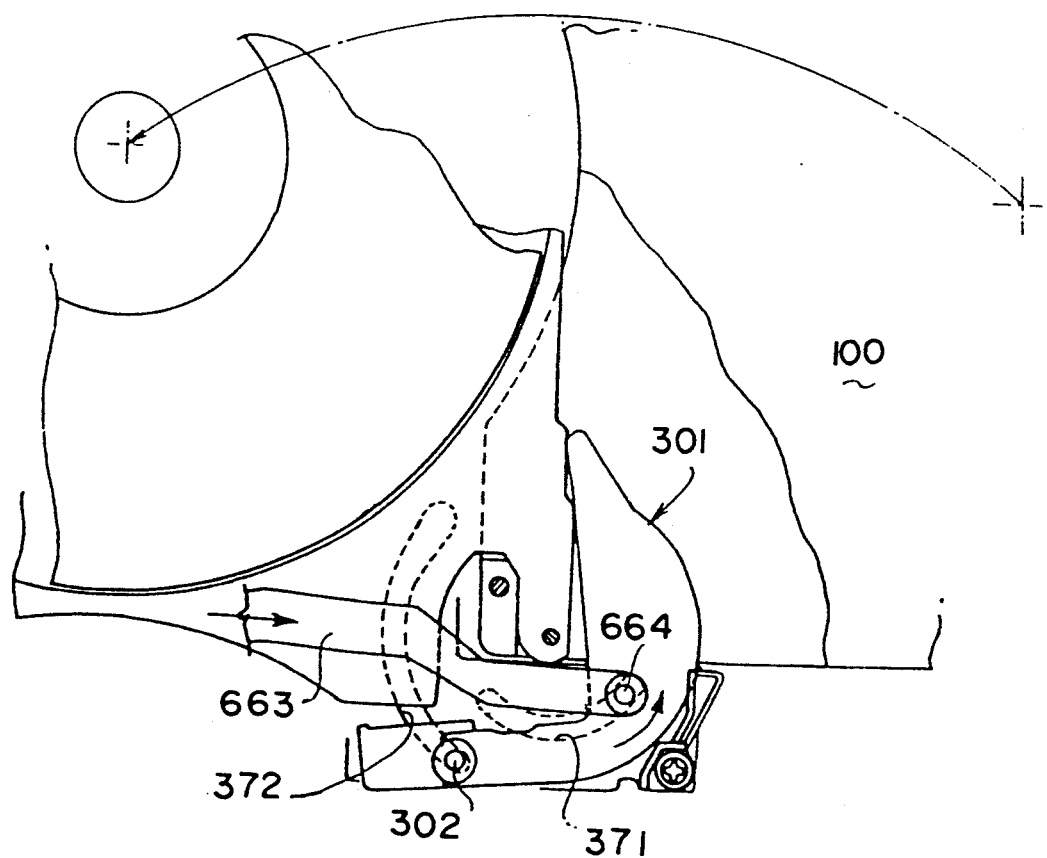

Referring to FIGS. 15 and 16, the loading lever 301 is pivotally mounted on a pin 302 which is slidably engaged with an arcuated slit 372 formed in a frame 740. On the other hand, the pin 664 is slidably engaged with an arcuated slit 371. Both the slits 372 and 371 have arcs with respect to the axis 103. The lever 301 has a positioning end 304 for positioning the tray 101 in the magazine 100 at the position of FIG. 13.

When the cam 610 rotates in the clockwise direction, the link 663 is moved forward (in the direction to the front part of the player) to turn the loading lever 301 in the counterclockwise direction along the slits 371 and 372.

In an early period, the pin 302 does not move, but only the pin 664 moves, so that the loading lever 301 is turned. Thus, the lever 301 is moved from the position of FIG. 15 to the position of FIG. 16, so that one of trays 101 is pivoted about the axis 103 to the loading position. When unloading the tray, the cam 610 is reversely rotated, so that the loading lever 301 is turned in the reverse direction. The end 304 pushes the tray, thereby turning the tray into the magazine.

Figure 17:
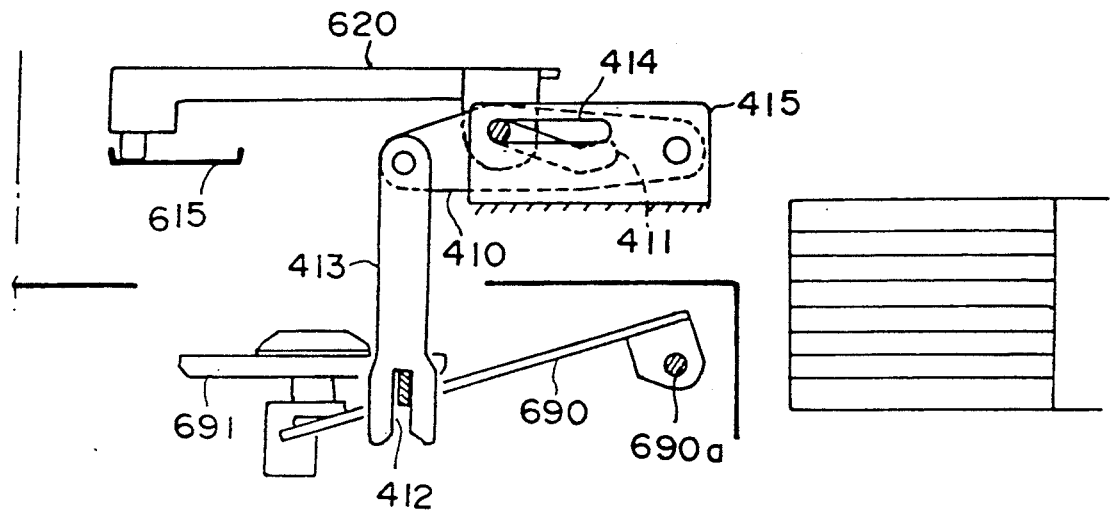
FIGS. 17 and 18 are side views showing cam operated switches.
Figure 18:
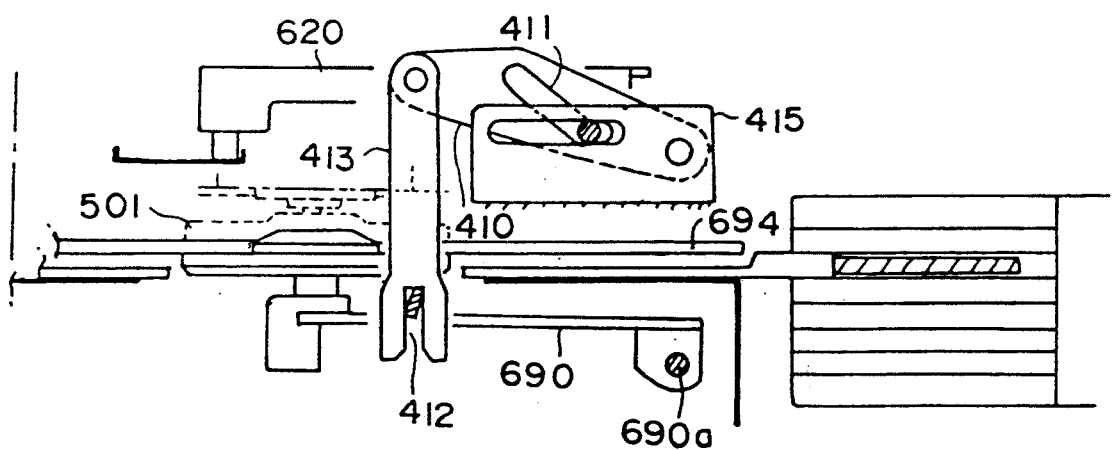

Referring to FIGS. 11, 17 and 18, the engaging pin 416 of the slide lever 620 slidably engages with a horizontal slit 414 of a guide plate 415 and slidably engages with an inclined slit 411 of a lever 410 which is pivoted on a pin 402a. The lever 410 is connected to a vertical lever 413 having an end slit 412 which is engaged with an end of a clamping arm 690. The clamping arm 690 is pivotally mounted on a shaft 690a at an end and connected to a CD clamper 691 at the other end.

When the slide lever 620 is forwardly moved by the cam groove 615, the lever 410 is pivoted in the clockwise direction to elevate the lever 413. Following the lever 413, the arm 690 is upwardly pivoted by a spring (not shown), so that the clamper 691 clamps a CD 694 on the tray 101 projected from the magazine 100 on a turntable 501. The turntable 501 is rotated by a motor 502 (FIG. 3a).

Figure 19:
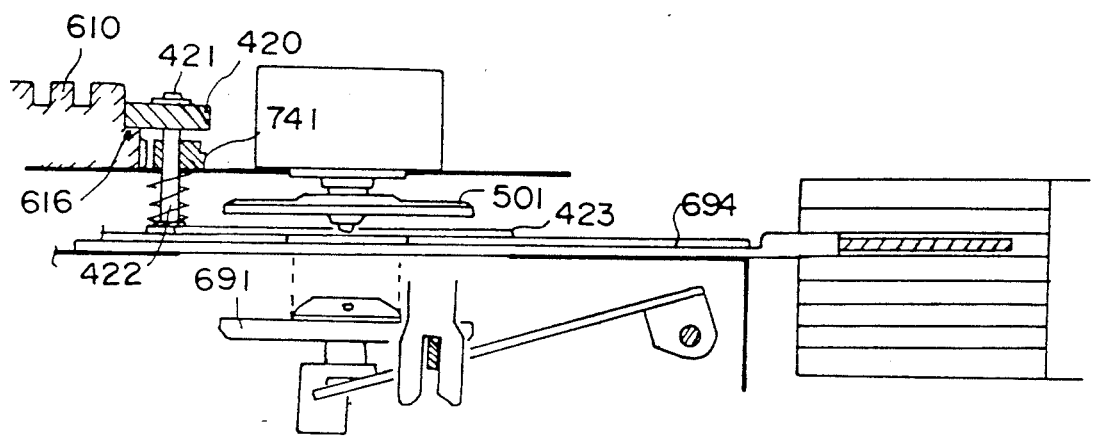
FIGS. 19 and 20 are side views showing a part of a turntable.
Figure 20:
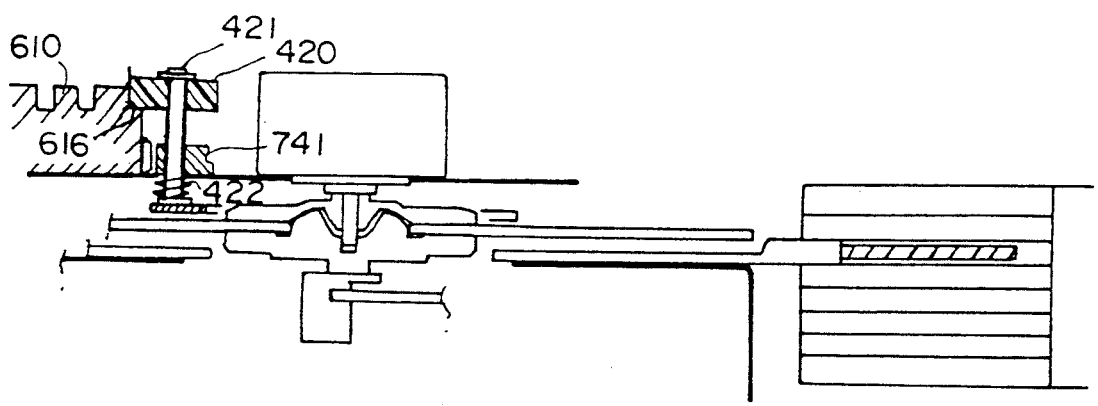
Figure 21:
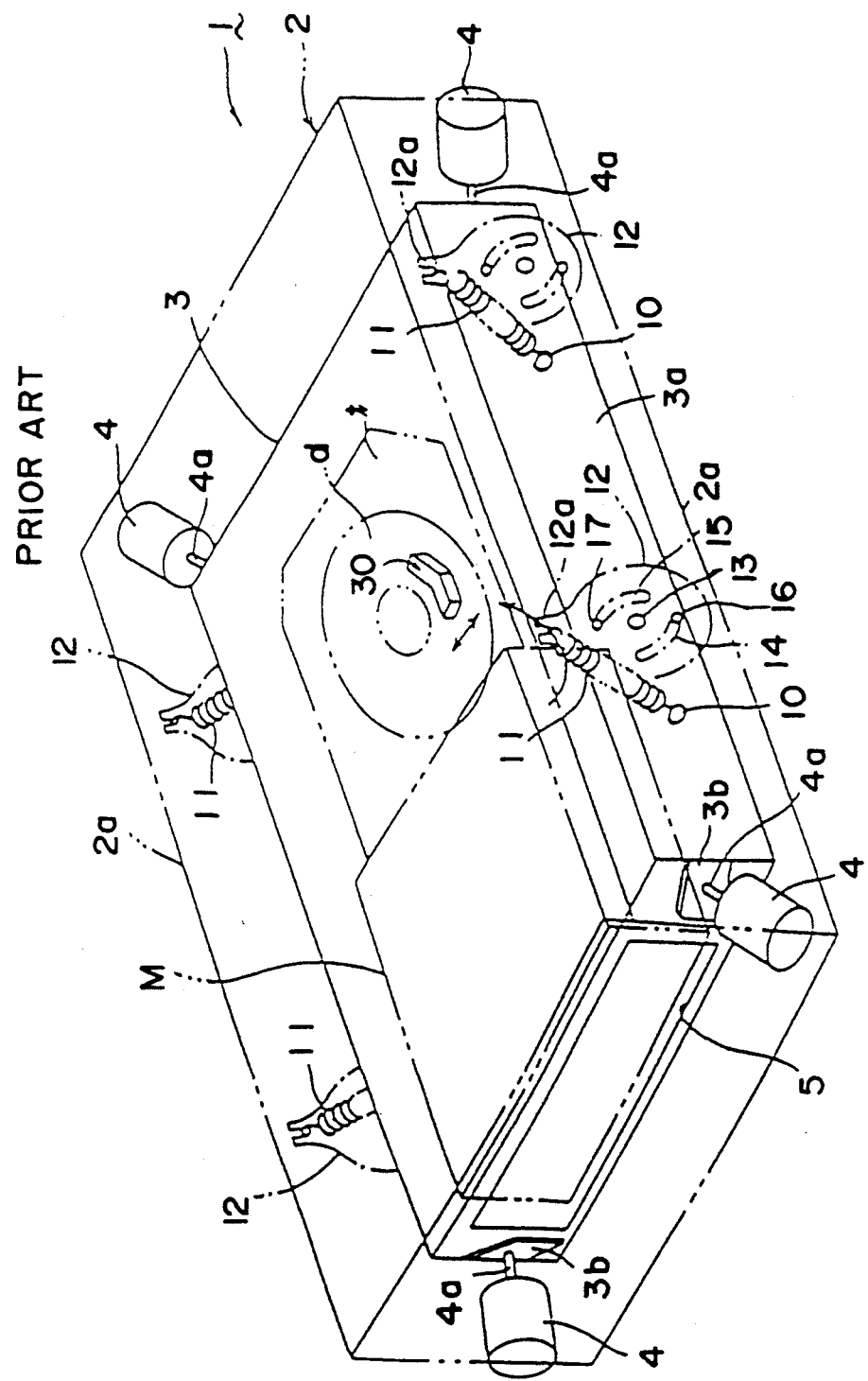
FIG. 21 is a perspective view showing a conventional CD player.

Referring to FIGS. 19 and 20, on the cam 616, a cam follower 420 is slidably mounted. The cam follower 420 is secured to a CD backup lever 423 through a shaft 421 which is slidably mounted in a frame 741. The cam follower is urged to the cam 616 by a spring 422.

When the cam 616 rotates, the cam follower 420 is vertically moved, thereby moving the lever 423, keeping a gap between the lever and the CD. When the CD 694 is clamped on the turntable 501 by the clamper 691, the lever 423 is upwardly moved as the clamper moves. When the CD is removed, the lever 423 is lowered by the cam 616.

Referring to FIG. 4, a photosensor P is provided adjacent the tray 101 at the playing position for detecting the existence of the tray. As shown in FIG. 4, the photosensor P reduces an output signal having various levels according to the level of the reflected beam from the CD and the tray. From the level, the removal of the CD from the turntable can be detected.

The output signals of the photosensor P and the tray control position detecting switch 632 are applied to a control unit not shown. A memory stores a program for reading the output signal of various switches and for controlling each motor in accordance with the results of reading the signal.

In operation, the pins 215 of the magazine holder 216 engage with the uppermost steps 213, so that the magazine holder is held at the uppermost position before playback. The magazine 100 is inserted into the magazine holder 216 from the inlet 205 by hand. The side of the magazine abuts on the end 256 of the swing lever 240 to pivot the lever in the clockwise direction against the spring 242. At the terminal end, the switch operating end 254 engages with the actuating lever 257 of the switch 253, thereby producing a signal representing the completion of the charging of the magazine 100.

The user operates a CD select switch provided on the dashboard of the car, so that the motor 608 starts to rotate the gear train 607. Thus, the slide plate 220 is forwardly moved and the slide plate 221 is rearwardly moved backward to lower the magazine holder 216 to a desired position dependent on the selection of the CD. The desired position is detected by the output signal of the photo sensor 232 (FIG. 3b) detecting the slits 231 of the position detector plate 230.

When a play key is operated, the motor 601 starts to rotate the cam 610 in the clockwise direction. As described above, the link 660 and the loading device 300 are operated to load the tray 101 of the selected CD to the playback position A (FIG. 4), and then the CD is removed from the tray by the clamping arm 690 and the clamper 691 and clamped on the turntable 501 by the CD clamper 691 (FIG. 18). Therefore, the motor 502 is driven to rotate the CD, thereby playing the CD.

When the playing of the CD finishes, the motor 601 operates in reverse to rotate the cam 610 in the counterclockwise direction. Thus, the CD clamper 691 is lowered, so that the CD is released from the turntable 501 and put on the tray 101. At that time, the CD backup lever 423 is slightly lowered to depress the CD, so that the CD is exactly fitted in a groove of the tray 101. Thereafter, the tray is returned to the magazine.

When one of the trays 101 is ejected from the magazine 100 housed in the space 202 to load the tray 101 to the turntable 501, the adjacent tray 101 is liable to drag out together with the ejected tray 101. Further, if the CD player is vertically mounted in the truck of the vehicle, the outlet of the magazine 100 is downwardly provided so that the trays 101 tend to be projected from the magazine 100.

In the embodiment, the frame 700 is provided with a pair of opposed tray stopper plates 721 and 722 made of metal plate on an upper frame portion 723 and a lower frame portion 724 thereof. A gap 725 is provided between opposed ends of the tray stopper plates 721 and 722. The gap 725 has a width slightly larger than the thickness of the tray 101, so that only the tray 101 can be ejected through the gap 725.

Figure 8:
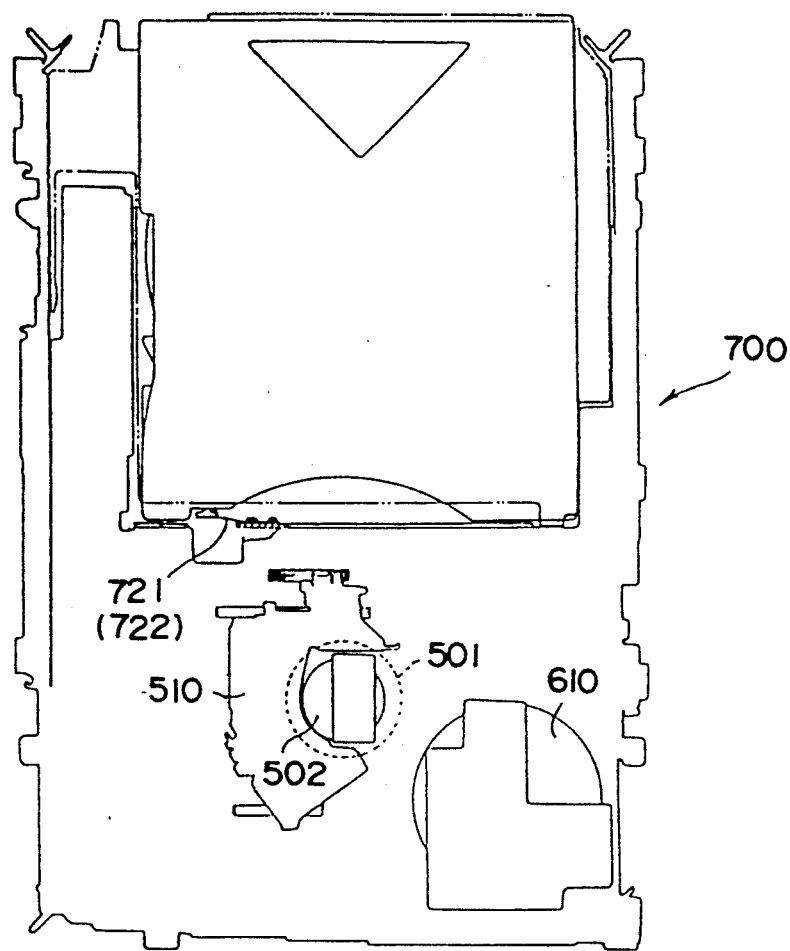
FIG. 8 is a plan view showing a stopper according to the present invention.
Figure 9:
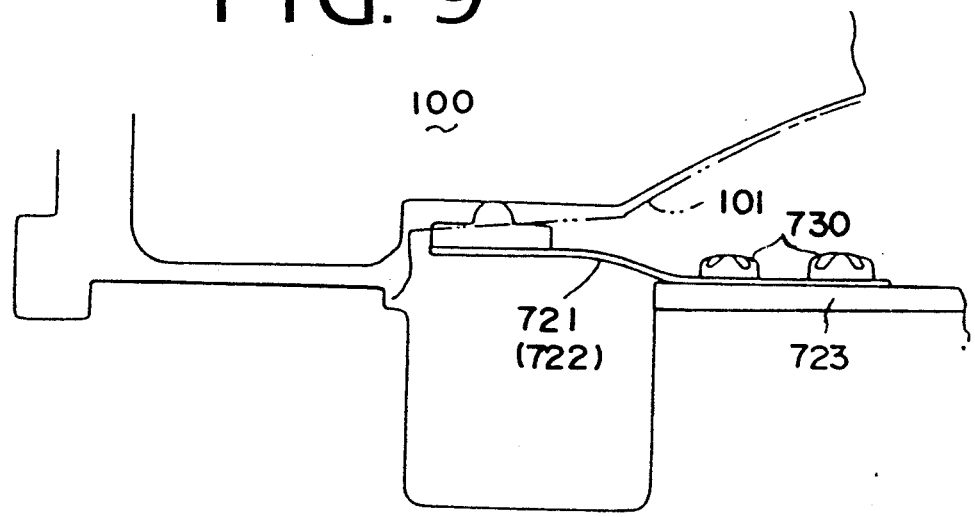
FIG. 9 is an enlarged view showing a part of FIG. 8.

Referring to FIGS. 8 and 9, the tray stopper plate 721 (722) is secured to the frame portion 723 (724) with screws 730. Thus, the stopper plates 721 and 722 are cantilevered to the frame portions 723 and 724 with elasticity. The stopper plates are provided adjacent the outlet of the magazine 100 at the lower portion thereof. If the tray 101 in the upright position is projected or hung from the magazine 100, the stopper plates engage with the tray 101 to push up the tray so as to maintain a normal position of the tray.

As a result, in the vertically disposed CD player, the CD tray 101 is not caught by a member in the magazine 100. Since the tray 101 is smoothly taken out from the magazine without breaking of the tray, shocks caused by vibration of the tray is not transmitted to the reproduction. Thus, unnecessary forces are not applied to the magazine mounting device 200 and the loading device 300, so that the loading and unloading operations are smoothly performed, thereby providing a long life playing of the player.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A tray stopper of a CD player, said CD player having a) a casing, b) a magazine containing a plurality of trays each of which mounts a CD, c) a moving device mounted in the casing for moving one of the CDs between the magazine and a playback position, d) a magazine holder mounted in the casing for holding the magazine, and e) a frame mounted inside the casing for vertically movably supporting the magazine holder, the tray stopper comprising:

a pair of opposed stopper plates cantilevered to the frame inside the casing adjacent to an inlet of the playback position and adjacent to an outlet of the magazine wherein both said stopper plates are supported on said frame with elasticity, opposed ends of the stopper plates being disposed to form a gap there-between having a width through which only one tray is passed.

2. The tray stopper according to claim 1, wherein each stopper plate is a metal plate secured to the frame.

* * * * *